US010169100B2

(12) United States Patent
Barzik et al.

(10) Patent No.: US 10,169,100 B2
(45) Date of Patent: Jan. 1, 2019

(54) SOFTWARE-DEFINED STORAGE CLUSTER UNIFIED FRONTEND

(71) Applicant: INTERNATIONAL BUSINESS MACHINES CORPORATION, Armonk, NY (US)

(72) Inventors: Zah Barzik, Rishon LeZion (IL); Lior Chen, Jerusalem (IL); Rivka M. Matosevich, Zichron-Ya'acov (IL); Nadav Parag, Rehovot (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 320 days.

(21) Appl. No.: 15/087,258

(22) Filed: Mar. 31, 2016

(65) Prior Publication Data
US 2017/0286144 A1 Oct. 5, 2017

(51) Int. Cl.
G06F 9/50 (2006.01)
G06F 9/455 (2018.01)
G06F 3/06 (2006.01)
H04L 29/08 (2006.01)

(52) U.S. Cl.
CPC .......... G06F 9/5077 (2013.01); G06F 3/0629 (2013.01); G06F 9/45558 (2013.01); H04L 67/1097 (2013.01); G06F 2009/45583 (2013.01)

(58) Field of Classification Search
None
See application file for complete search history.

(56) References Cited

U.S. PATENT DOCUMENTS

| 7,222,176 | B1 | 5/2007 | Laurent et al. |
| 7,529,816 | B2 | 5/2009 | Hayden et al. |
| 7,568,216 | B2 | 7/2009 | Spry et al. |
| 9,059,976 | B2 | 6/2015 | Lacapra |
| 9,060,008 | B2 | 6/2015 | Helman et al. |
| 9,128,622 | B1 | 9/2015 | Yang et al. |
| 2014/0115579 | A1 | 4/2014 | Kong |

FOREIGN PATENT DOCUMENTS

WO 2015065476 A1 5/2015

Primary Examiner — Qing Yuan Wu
(74) Attorney, Agent, or Firm — Griffiths & Seaton PLLC

(57) ABSTRACT

Methods, computing systems and computer program products implement embodiments of the present invention that include initializing a plurality of first layer software defined storage (SDS) clusters, each of the first layer SDS clusters including multiple storage nodes executing in separate independent virtual machines on respective separate independent servers. A second layer SDS cluster including a combination of the first layer SDS clusters is defined, and using a distributed management application, the second layer SDS cluster is managed, the distributed management application including multiple management nodes executing on all of the servers. In one embodiment, each of the storage nodes executes within a separate independent virtual machine, and each of the virtual machines executes a given management node. In another embodiment, each of the storage nodes executes within a separate independent first virtual machine, and each server includes a second virtual machine that executes a given management node.

14 Claims, 5 Drawing Sheets

SOFTWARE-DEFINED STORAGE CLUSTER UNIFIED FRONTEND

FIELD OF THE INVENTION

The present invention relates generally to software-defined storage, and specifically to a method for implementing a unified frontend for multiple software defined storage clusters running on a set of servers.

BACKGROUND

In software-defined computing (SDC), a computing infrastructure is virtualized and delivered as a service. For example, in a software-defined storage (SDS) system storage hardware is separated from software that manages the storage infrastructure. In SDS, the software managing a software-defined storage environment may also provide policy management for features such as deduplication, replication, thin provisioning, snapshots and backup. By definition, SDS software is separate from the hardware it is managing, and can be implemented via appliances over a traditional Storage Area Network (SAN), or implemented as part of a scaled-out Network-Attached Storage (NAS) solution, or as the basis of an Object-based storage solution.

The description above is presented as a general overview of related art in this field and should not be construed as an admission that any of the information it contains constitutes prior art against the present patent application.

SUMMARY

There is provided, in accordance with an embodiment of the present invention a method, including initializing a plurality of first layer software defined storage (SDS) clusters, each of the first layer SDS clusters including multiple storage nodes executing in separate independent virtual machines on respective separate independent servers, defining a second layer SDS cluster including a combination of the first layer SDS clusters, and managing, using a distributed management application, the second layer SDS cluster, the distributed management application including multiple management nodes executing on all of the servers.

There is also provided, in accordance with an embodiment of the present invention an apparatus, including a data network, and multiple servers coupled to the network, a given server being configured to initialize a plurality of first layer software defined storage (SDS) clusters, each of the first layer SDS clusters including multiple storage nodes executing in separate independent virtual machines on respective separate independent servers, to define a second layer SDS cluster including a combination of the first layer SDS clusters, and to manage, using a distributed management application, the second layer SDS cluster, the distributed management application including multiple management nodes executing on all of the servers.

There is further provided, in accordance with an embodiment of the present invention a computer program product, the computer program product including a non-transitory computer readable storage medium having computer readable program code embodied therewith, the computer readable program code including computer readable program code configured to initialize a plurality of first layer software defined storage (SDS) clusters, each of the first layer SDS clusters including multiple storage nodes executing in separate independent virtual machines on respective separate independent servers, computer readable program code configured to define a second layer SDS cluster including a combination of the first layer SDS clusters; and computer readable program code configured to manage, using a distributed management application, the second layer SDS cluster, the distributed management application including multiple management nodes executing on all of the servers.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
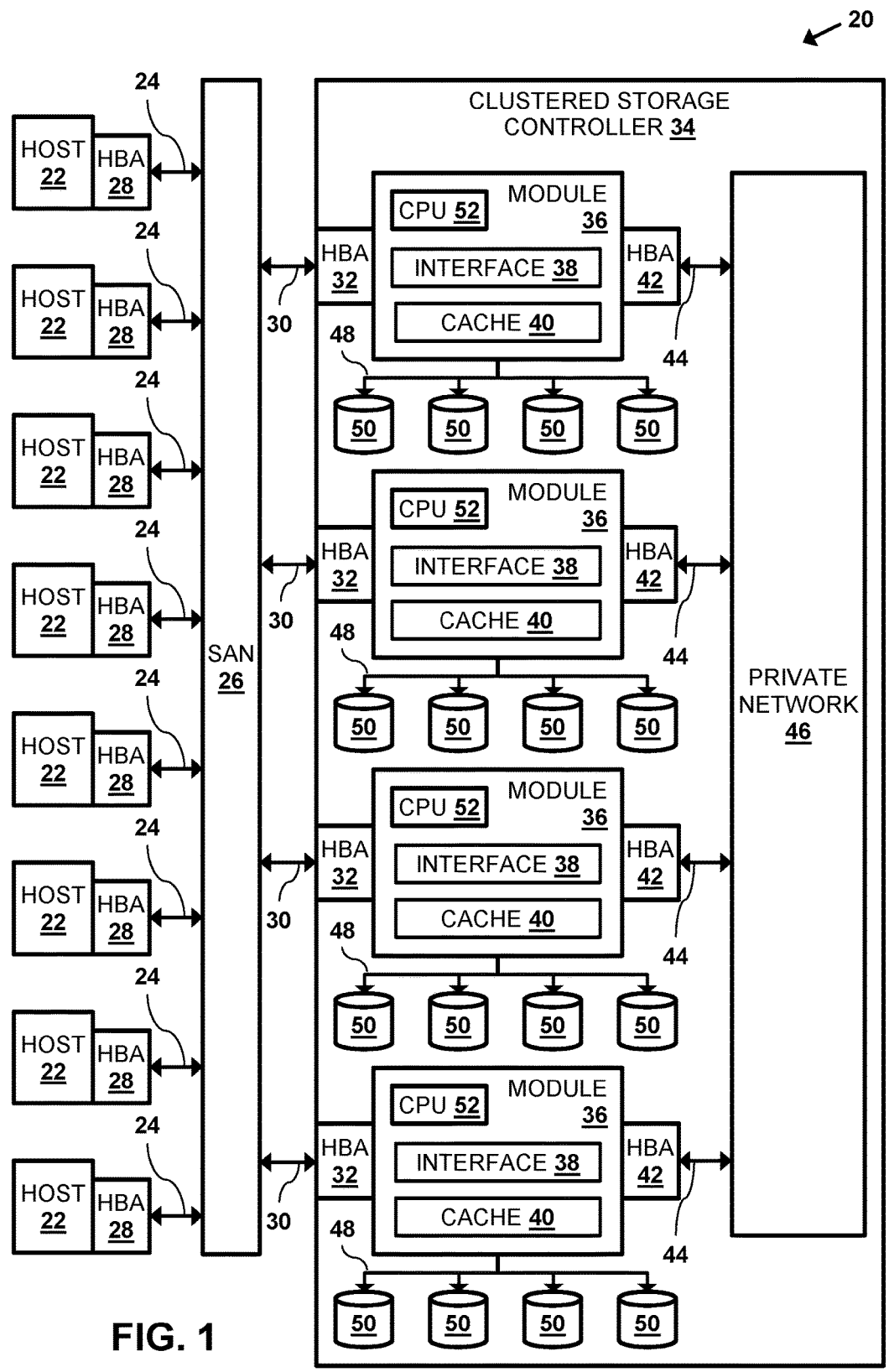
FIG. 1 is a block diagram that schematically illustrates a storage system comprising a storage controller having multiple modules configured to deploy a software defined storage (SDS) supercluster comprising a plurality of SDS clusters, in accordance with an embodiment of the present invention.

SDS software can be deployed on multiple servers in parallel in order to define an SDS cluster. In the SDS cluster, each of the SDS systems comprises a storage node, and the storage nodes in the SDS cluster can work together in order to function as a distributed storage system with improved performance and availability.

SDS clusters may have limitations on scale which are due to internal management limitations or limitations resulting from failure domain considerations. For example, an SDS cluster may not be able to scale beyond a defined number of back-end storage devices (e.g., hard disk drives) without increasing the risk of multiple failures. Another limitation may be the complexity of internal management algorithms, which can limit the number of nodes in the SDS cluster. This can also limit the SDS cluster's ability to fully utilize powerful compute nodes or highly dense storage nodes comprising a high density storage architecture such as "just a bunch of disks" (JBOD) or "just a bunch of flash" (JBOF) that can support a large number of storage devices.

Embodiments of the present invention provide systems and methods for deploying multiple SDS clusters over a joint set of hardware resources so that each of the SDS clusters is a logically separate system having its own failure domain and management. As explained hereinbelow, a plurality of a first layer software defined storage (SDS) clusters are initialized, wherein each of the first layer SDS clusters comprises multiple storage nodes executing in separate independent virtual machines on respective separate independent servers. A second layer SDS cluster comprising a combination of the first layer SDS clusters is defined, and the second layer SDS cluster can be managed by a distributed management application comprising multiple management nodes executing on all of the servers.

In some embodiments, the first layer SDS clusters comprising multiple storage nodes executing in separate independent virtual machines on respective separate independent servers comprise a subset of the servers shared by nodes belonging to different SDS clusters. The second (i.e., an additional) layer of SDS software components is also deployed to provide an abstraction of the first layer SDS clusters, in order to provide unified management and/or to present a front-end interface to the user. The second layer of nodes can be deployed on the same set of the servers, on a subset of the servers, on an overlapping set of the servers, or on a disjoint set of the servers.

In additional embodiments, the distributed management application may be configured to function as an Internet Small Computer System Interface (iSCSI) gateway server which tracks the location of each volume in all the first SDS clusters and forwards input/output (I/O) operations accordingly. In systems implementing embodiments of the present invention:

- Multiple first layer SDS clusters can deployed in parallel on a given set of (physical) servers in a manner that matches the capabilities and available capacity of the storage nodes.
- Each server can provide front-end connectivity by executing an iSCSI gateway service which tracks the current location of each volume from any of the first SDS clusters running on that server. The iSCSI gateway service can execute either in a separate virtual machine or on one or more of the virtual machines running the storage nodes.
- The iSCSI gateway service can forward, from an originating host, iSCSI traffic over a high speed internal communication channel to a storage node from the relevant first cluster. Examples of communication channels include, but are not limited to, virtual networks running on a hypervisor, shared memory mechanisms and virtual serial connections.
- Responses are returned from a node through the high speed internal communication channel and through the iSCSI gateway service to the originating host.
- When volumes are migrated between storage nodes, routing tables (i.e., volume mapping) on the iSCSI (i.e., mapping) service can be updated accordingly, thus preventing the need for a rescan on the servers.
- Volume migration can be performed between storage nodes from the different first layer SDS clusters over a high-speed virtualized internal communication channel, over a physical infrastructure used for back-end connectivity, or over a combination of the two.
- Volume migration can be performed either manually or according to load balancing rules in order to balance capacity (e.g., processor and storage) utilized by each of the first clusters.
- An external management utility may encapsulate this architecture and expose a single-system interface.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes a processor 52, an interface 38 (in communication between adapters and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, or solid state drives (SSDs) which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

While the configuration in FIG. 1 shows storage controller 34 comprising four modules 36 and each of the modules coupled to four storage devices 50, a given storage controller comprising any multiple of modules 36 coupled to any plurality of storage devices 50 is considered to be with the spirit and scope of the present invention.

Figure 2:
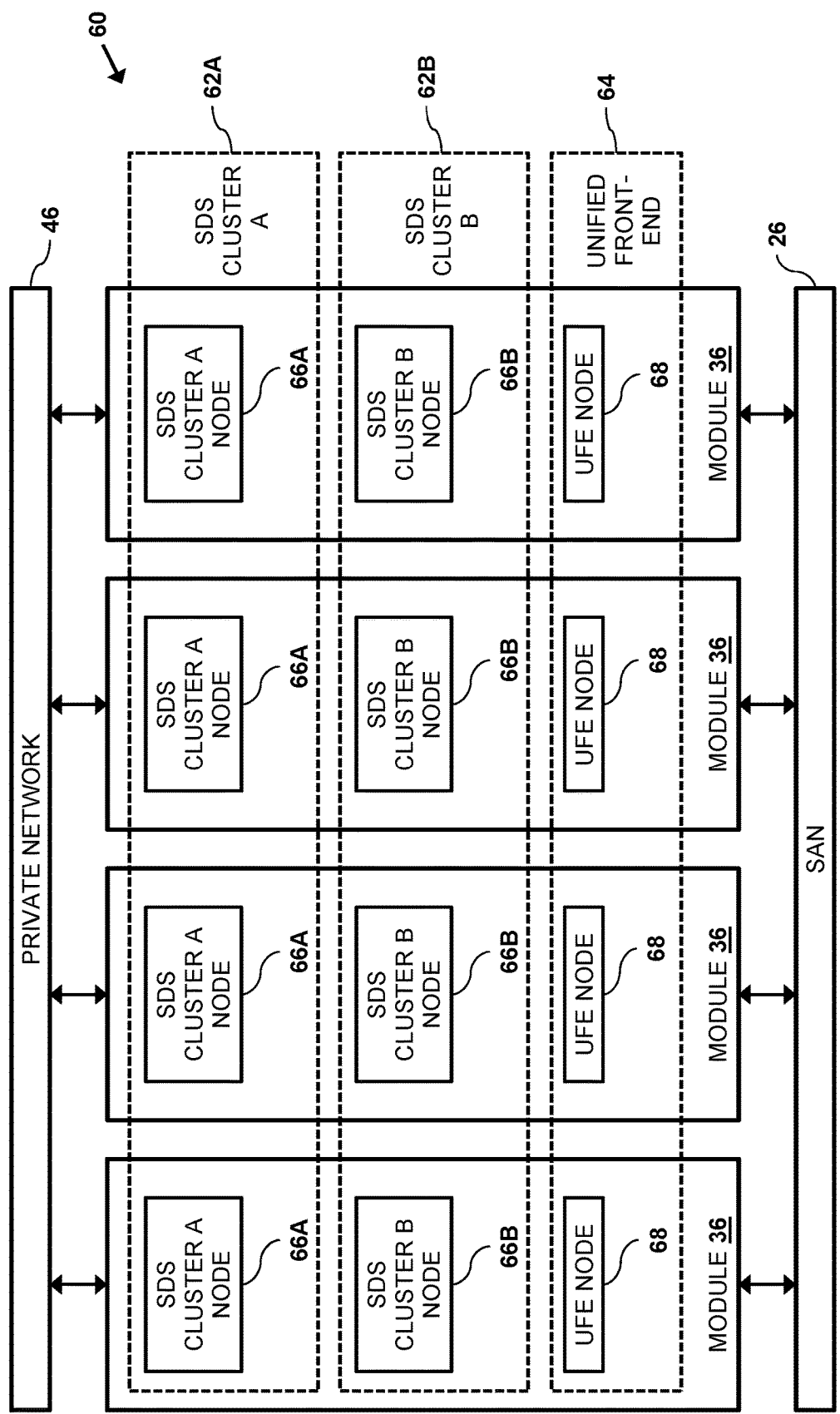
FIG. 2 is a block diagram that schematically illustrates the SDS supercluster deployed on the storage controller, in accordance with a first embodiment of the present invention.

FIG. 2 is a block diagram that schematically illustrates an SDS supercluster 60 comprising multiple SDS clusters 62 and a unified frontend (UFE) application 64 that are deployed on modules 36 of storage controller 34, in accordance with a first embodiment of the present invention. In embodiments described herein, modules 36 may also be referred to as servers, SDS clusters 62 may also be referred to as first SDS clusters, SDS supercluster 60 comprising a parallel deployment of SDS clusters 62 that may also be referred to as a second SDS cluster, and unified frontend application 64 may also be referred to as a distributed management application.

While the configuration in FIG. 2 shows deploying SDS cluster nodes 66 on modules 36 that are coupled to private network 46, deploying the SDS clusters in any set of networked servers (i.e., computer systems offering storage services) that are coupled to (and communicate over) a back-end data network is considered to be within the spirit and scope of the present invention. Likewise, while the configuration in FIG. 2 shows deploying SDS cluster nodes 66 on modules 36 that are coupled to SAN 26, deploying the SDS cluster nodes coupled to a frontend data network to communicate with computers (e.g., host computers 22) is considered to be within the spirit and scope of the present invention.

In FIG. 2, SDS clusters 62 and their respective components are differentiated by appending a letter to the identifying numeral, so that the SDS clusters comprise SDS clusters 62A and 62B. While embodiments herein describe SDS supercluster 60 comprising SDS clusters 62A and 62B, the SDS supercluster comprising three or more of the SDS clusters is considered to be within the spirit and scope of the present invention. In embodiments herein, SDS clusters 62 may also be referred to as first layer SDS clusters, and SDS supercluster 60 may also be referred to a second layer SDS cluster.

Each SDS cluster 62 comprises multiple SDS cluster nodes (also referred to herein as storage nodes) 66, and unified frontend application 64 comprises multiple unified frontend nodes (also referred to herein as management nodes) 68. The configuration of SDS cluster nodes 66 is described in the description referencing FIG. 3 hereinbelow. In the configuration shown in FIG. 2, each module 36 comprises an operating system 76, a given SDS cluster node 66 for each SDS cluster 62, and a given unified frontend node 68.

Figure 3:
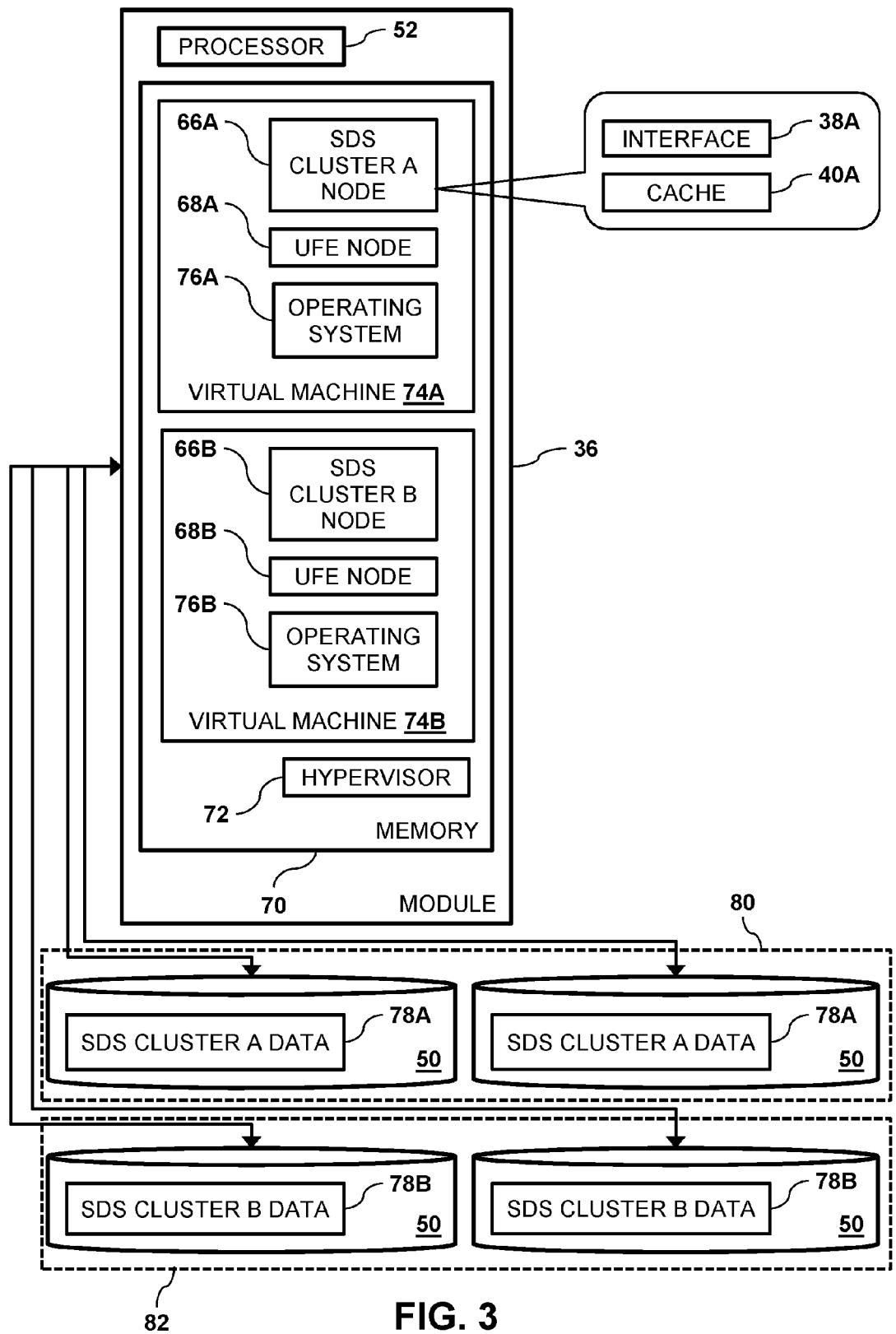
FIG. 3 is a block diagram that schematically illustrates a given module configured as a node of a given SDS cluster, in accordance with a first embodiment of the present invention.

FIG. 3 is a block diagram that schematically illustrates a given module 36 hosting the storage nodes of SDS supercluster 60, in accordance with a first embodiment of the present invention. In addition to storage devices 50 and processor 52, each module 36 comprises a memory 70.

In operation, processor 52 executes from memory 70, a hypervisor 72 that configures and manages virtual machines 74 in the memory. In FIG. 3, virtual machines 74 and their respective components are differentiated by appending a letter to the identifying numeral, so that the virtual machines comprise virtual machines 74A and 74B.

In the configuration shown in FIG. 3, each virtual machine 74 comprises an operating system 76, a given SDS cluster node 66 and a given unified frontend node 68. Each SDS cluster node 66 comprises a given interface 38 and a given cache 40.

In operation, SDS supercluster 60 can be configured so that data 78 managed by each SDS cluster 62 is stored on separate independent storage devices 50. In the configuration shown in FIG. 3, SDS cluster node 66A manages data 78A on a first set 80 of two storage devices 50, and SDS cluster node 66B manages data 78B on a second set 82 of the storage devices. Data 78 is typically stored as logical volumes on storage devices 50.

Figure 4:
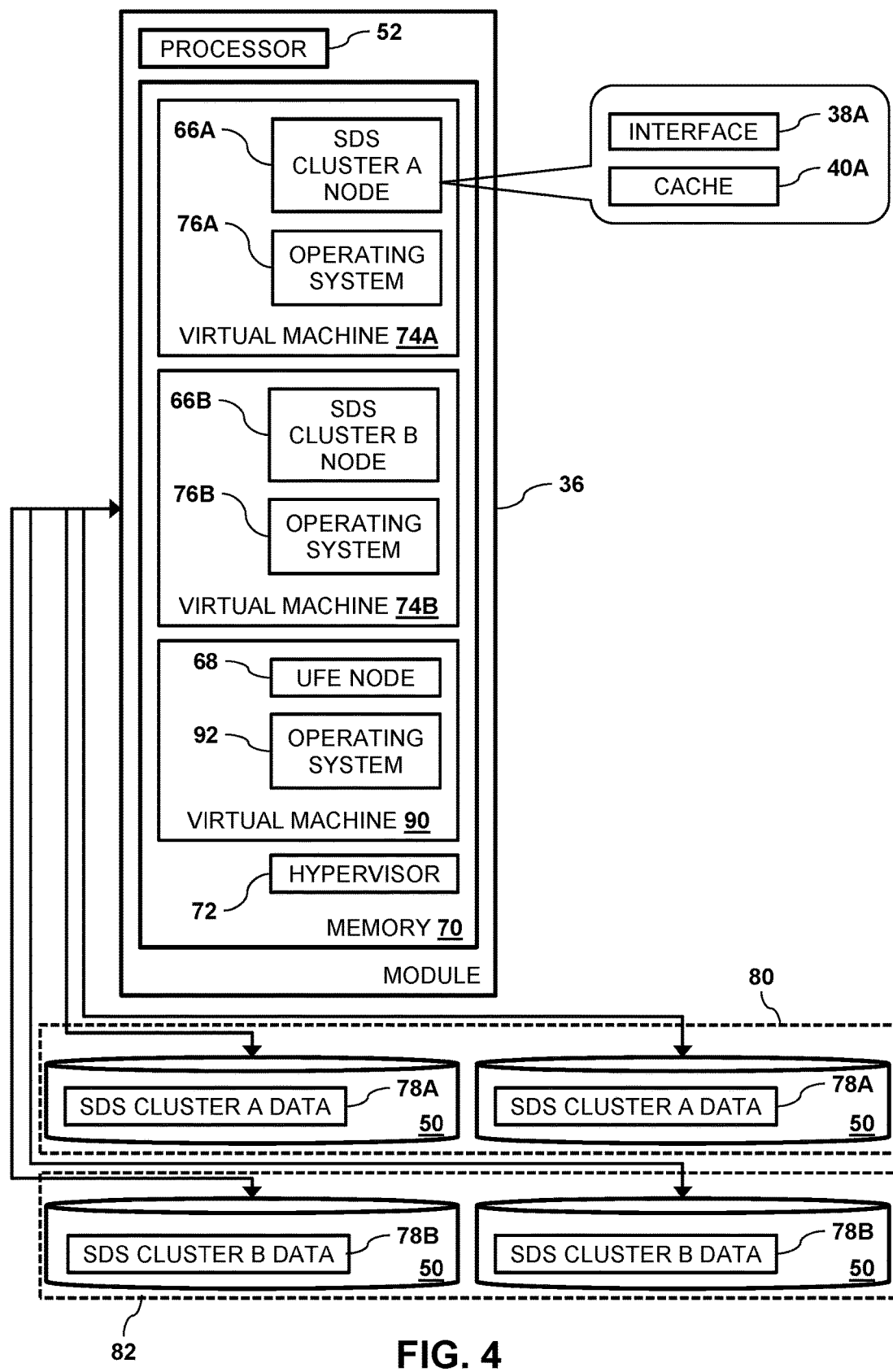
FIG. 4 is a block diagram that schematically illustrates a given module configured as a given node of a given SDS cluster, in accordance with a second embodiment of the present invention.

FIG. 4 is a block diagram that schematically illustrates a given module 36 hosting the storage nodes of SDS supercluster 60, in accordance with a second embodiment of the present invention. In the configuration shown in FIG. 4, each virtual machine 74 comprises a given operating system 76 and a given SDS cluster node 66, and hypervisor 72 configures and manages an additional virtual machine 90 comprising an operating system 92 and unified frontend node 68. In other words, while the configuration in FIG. 3 comprises a separate instance of unified frontend node 68 in a given virtual machine 74 comprising a given SDS cluster node 66, the configuration in FIG. 4 comprises the unified frontend node executing in a separate independent virtual machine 90.

Processors 52 comprise general-purpose central processing units (CPU) or special-purpose embedded processors, which are programmed in software or firmware to carry out the functions described herein. The software may be downloaded to modules 36 in electronic form, over a network, for example, or it may be provided on non-transitory tangible media, such as optical, magnetic or electronic memory media. Alternatively, some or all of the functions of processor 52 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

SDS Supercluster Configuration and Management

Figure 5:
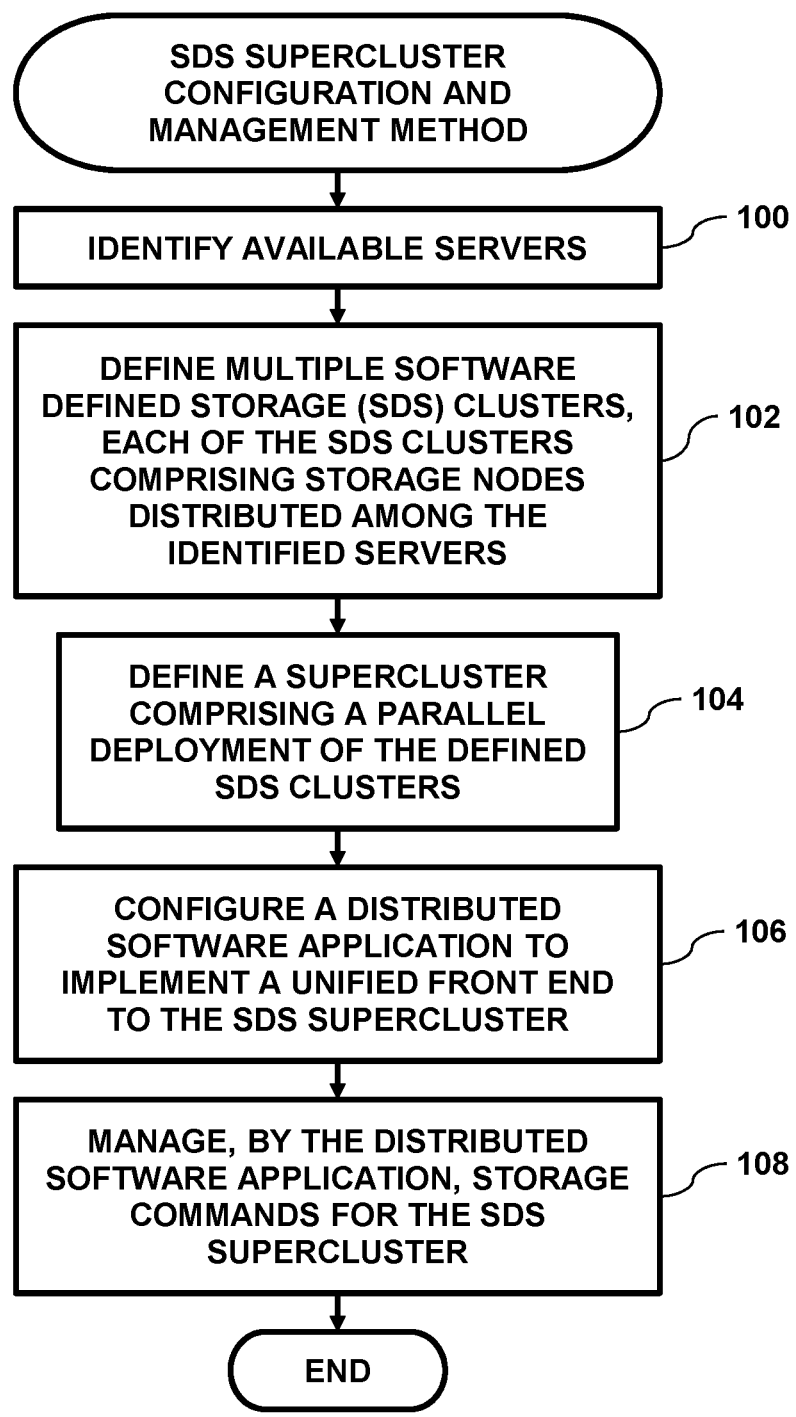
FIG. 5 is a flow diagram that schematically illustrates a method of configuring and managing the SDS supercluster, in accordance with an embodiment of the preset invention.

FIG. 5 is a flow diagram that schematically illustrates a method of configuring and managing SDS supercluster 60, in accordance with an embodiment of the present invention. In an identification step 100, a given processor 52 identifies servers (e.g., modules 36) coupled to network 46, and in a first definition step 102, the given processor defines SDS clusters 62, each of the defined SDS clusters comprising SDS cluster nodes 66 that are distributed among the servers.

In a second definition step 104, the given processor defines SDS supercluster 60 comprising a parallel deployment of SDS clusters 66, and in a configuration step 106, distributed management application 64 is configured to provide, to computers (e.g., host computers 22) in communication with modules 36, a unified frontend to SDS supercluster 60. Finally, in a management step 108, unified frontend application 64 manages operation of SDS supercluster 60, and the method ends.

In one embodiment, unified frontend application 64 can manage operation of SDS supercluster 60 by receiving a storage command from a given computer 22, identifying a given SDS cluster 62 configured to process the storage command, conveying the storage command to the identified SDS cluster, receiving, from the identified SDS cluster, a result of the storage command, and conveying the result to the given computer. In a second embodiment, unified frontend application 64 can manage operation of SDS supercluster 60 by maintaining mappings of logical volumes stored on the first SDS clusters. For example, if a given logical volume is migrated from a first given SDS cluster node 66 to a second given SDS cluster node 66 (either within the same SDS cluster 62 or from a first given SDS cluster to a second given SDS cluster 62), unified frontend application 64 can maintain mapping tables (not shown) that can eliminate any need rescan modules 36.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   initializing a plurality of first layer software defined storage (SDS) clusters, each of the first layer SDS clusters comprising multiple storage nodes, each of the multiple storage nodes executing in separate independent virtual machines on respective separate independent servers;
   defining a second layer SDS cluster comprising a combination of the first layer SDS clusters; and
   managing, using a distributed management application, the second layer SDS cluster, the distributed management application comprising multiple management nodes executing on all of the servers; wherein each of the separate independent virtual machines comprises a first virtual machine, and wherein each server comprises a second virtual machine that executes a given management node; and wherein the distributed management application comprising the multiple management nodes executing on all of the servers provides a unified front-end interface for accessing each of the first layer SDS cluster and the second layer SDS clusters.

2. The method according to claim 1, wherein each of the virtual machines executes a given management node.

3. The method according to claim 1, wherein managing the second layer SDS cluster comprises receiving a storage command from a computer in communication with the storage system, identifying a given first layer SDS cluster configured to process the storage command, conveying the storage command to the given first layer SDS cluster, receiving, from the given first layer SDS cluster, a result of the storage command, and conveying the result to the computer.

4. The method according to claim 1 wherein managing the second layer SDS cluster comprises maintaining mappings of logical volumes stored on the first layer SDS clusters.

5. The method according to claim 1, wherein the distributed management application comprises an Internet Small Computer System Interface (iSCSI) gateway service.

6. An apparatus, comprising:
   a data network; and
   multiple servers coupled to the network, a given server having a hardware processor executing instructions stored in a memory, wherein when executed, the instructions cause the hardware processor:
   to initialize a plurality of first layer software defined storage (SDS) clusters, each of the first layer SDS clusters comprising multiple storage nodes, each of the multiple storage nodes executing in separate independent virtual machines on respective separate independent servers,
   to define a second layer SDS cluster comprising a combination of the first layer SDS clusters, and
   to manage, using a distributed management application, the second layer SDS cluster, the distributed management application comprising multiple management nodes executing on all of the servers; wherein each of the separate independent virtual machines comprises a first virtual machine, and wherein each server comprises a second virtual machine that executes a given management node; and wherein the distributed management application comprising the multiple management nodes executing on all of the servers provides a unified front-end interface for accessing each of the first layer SDS cluster and the second layer SDS clusters.

7. The apparatus according to claim 6, wherein each of the virtual machines executes a given management node.

8. The apparatus according to claim 6, wherein the distributed management application is configured to manage the second layer SDS cluster by receiving a storage command from a computer in communication with the storage system, identifying a given first layer SDS cluster configured to process the storage command, conveying the storage command to the given first layer SDS cluster, receiving, from the given first layer SDS cluster, a result of the storage command, and conveying the result to the computer.

9. The apparatus according to claim 6 wherein the distributed management application is configured to manage the second layer SDS cluster by maintaining mappings of logical volumes stored on the first layer SDS clusters.

10. The apparatus according to claim 6, wherein the distributed management application comprises an Internet Small Computer System Interface (iSCSI) gateway service.

11. A computer program product, the computer program product comprising:

a non-transitory computer readable storage medium having computer readable program code embodied therewith, the computer readable program code comprising:

computer readable program code configured to initialize a plurality of first layer software defined storage (SDS) clusters, each of the first layer SDS clusters comprising multiple storage nodes, each of the multiple storage nodes executing in separate independent virtual machines on respective separate independent servers;

computer readable program code configured to define a second layer SDS cluster comprising a combination of the first layer SDS clusters; and computer readable program code configured to manage, using a distributed management application, the second layer SDS cluster, the distributed management application comprising multiple management nodes executing on all of the servers; wherein each of the separate independent virtual machines comprises a first virtual machine, and wherein each server comprises a second virtual machine that executes a given management node; and wherein the distributed management application comprising the multiple management nodes executing on all of the servers provides a unified front-end interface for accessing each of the first layer SDS clusters and the second layer SDS cluster.

12. The computer program product according to claim 11, wherein each of the virtual machines executes a given management node.

13. The computer program product according to claim 11, wherein the computer readable program code is configured manage the second layer SDS cluster by receiving a storage command from a computer in communication with the storage system, identifying a given first layer SDS cluster configured to process the storage command, conveying the storage command to the given first layer SDS cluster, receiving, from the given first layer SDS cluster, a result of the storage command, and conveying the result to the computer.

14. The computer program product according to claim 11 wherein the computer readable program code is configured manage the second layer SDS cluster by maintaining mappings of logical volumes stored on the first layer SDS clusters.

* * * * *